United States Patent [19]

Johnson

[11] Patent Number: 4,715,898
[45] Date of Patent: Dec. 29, 1987

[54] SULFONIUM RESINS USEFUL AS PIGMENT GRINDING VEHICLES IN CATIONIC ELECTRODEPOSITION

[75] Inventor: Mark W. Johnson, Glenshaw, Pa.

[73] Assignee: PPG Industries, Inc., Pittsburgh, Pa.

[21] Appl. No.: 880,379

[22] Filed: Jun. 30, 1986

[51] Int. Cl.⁴ .................... C04B 14/00; C08G 59/14; C08G 59/40
[52] U.S. Cl. .............................. 106/308 Q; 528/109; 525/533
[58] Field of Search ....................... 528/109; 525/533; 106/308 Q

[56] References Cited

U.S. PATENT DOCUMENTS

| | | | |
|---|---|---|---|
| 3,793,278 | 2/1974 | De Bona | 160/272 |
| 3,935,087 | 1/1976 | Jerabek et al. | 204/181.7 |
| 3,936,405 | 2/1976 | Sturni et al. | 523/414 |
| 3,959,106 | 5/1976 | Bosso et al. | 204/181 |
| 4,007,154 | 2/1977 | Schimmel et al. | 523/435 |
| 4,038,232 | 7/1977 | Bosso et al. | 523/410 |
| 4,066,525 | 1/1978 | Woo et al. | 204/181.7 |
| 4,186,124 | 1/1980 | Shimmel et al. | 525/528 |
| 4,246,089 | 1/1981 | Hazan | 204/181 |
| 4,593,078 | 6/1986 | Kooymans et al. | 525/497 |

Primary Examiner—Harold D. Anderson
Assistant Examiner—Dennis R. Daley
Attorney, Agent, or Firm—William J. Uhl

[57] ABSTRACT

A cationic resin suitable for use as a pigment grinding vehicle is disclosed. The cationic resin is derived from an epoxy resin and contains ternary sulfonium groups and alkyl phenoxide groups. Pigment pastes derived from this cationic resin can be used in a method of cationic electrodeposition where they provide for films with high build and good appearance.

16 Claims, No Drawings

SULFONIUM RESINS USEFUL AS PIGMENT GRINDING VEHICLES IN CATIONIC ELECTRODEPOSITION

BACKGROUND OF THE INVENTION

1. Field of the Invention

The present invention relates to cationic resins and to the use of these resins as pigment grinding vehicles in pigment pastes and in a method of cationic electrodeposition.

2. Brief Description of the Prior Art

In the formulation of paints and especially electrodepositable paints, an important factor is the introduction of pigments into the paint. The pigments are typically ground in a pigment grinding vehicle, which acts as a dispersing agent, to form a paste and the resultant pigment paste is blended with the main resinous vehicle and optionally diluents to form the paint. For electrodeposition paints, the pigment grinding vehicle preferably is a resinous material having the same charge as the main resinous vehicle, so that it will electrodeposit with the main resinous vehicle. Typical pigment grinding vehicles for cationic electrodeposition are quaternary ammonium salt group-containing resins such as described in U.S. Pat. Nos. 4,007,154 and 4,186,124.

High film build electrodeposition resins are becoming increasingly popular in the automotive industry where they can be deposited as primers without requiring the application of an intermediate coating of primer-surfacer before application of the top coat. Unfortunately, these high film build electrodeposition primers are difficult to apply with good appearance. They are often rough and have pinholes, particularly over metal substrates such as galvanized steel. Although many factors contribute to the appearance of the electrodeposited film, the pigment grinding vehicle is believed to contribute significantly in this regard.

Also, it is difficult to synthesize a pigment grinding vehicle which produces smooth films while maintaining high rupture voltages. The rupture voltage is the lowest voltage at which the electrodepositing film will rupture. High rupture voltages are desirable because the higher the voltage one can electrodeposit without rupturing the film, the higher the throwpower. High throwpowers are desirable because they enable a film to be electrodeposited in areas shielded from the counter electrode.

SUMMARY OF THE INVENTION

In accordance with the present invention, it has been found that the pigment grinding vehicles of the present invention provide for high film build electrodeposition primers with good appearance and good coating properties, i.e., high rupture voltages. The pigment grinding vehicle is a cationic resin derived from an epoxy resin and contains ternary sulfonium groups and alkyl phenoxide groups in which the alkyl group contains at least 4 carbon atoms.

DETAILED DESCRIPTION

The cationic resin of the present invention is derived from an epoxy resin and can be prepared by reacting an epoxy resin with a sulfide-acid mixture and with an alkyl phenol.

The epoxy resins are typically polymeric polyepoxides which have a 1,2-epoxy equivalency greater than 1.0, that is, in which the average number of 1,2-epoxy groups per molecule is greater than one. Preferably, the epoxy resin will have an epoxy equivalency of 1.8 to 2.2, most preferably about 2.

A useful class of polyepoxides are the polyglycidyl ethers of polyphenols such as bisphenol F and bisphenol A, which is preferred. These may be prepared, for example, by etherification of the polyphenol with epichlorohydrin or dichlorohydrin in the presence of alkali. The polyphenol may be bis(4-hydroxy-phenyl)-2,2-propane, 4,4'-dihydroxybenzophenone, bis(4-hydroxyphenyl)-1,1-ethane or the like. Another quite useful class of polyepoxides are produced similarly from novolak resins or similar polyphenol resins.

Also suitable are polyglycidyl ethers of aliphatic and cycloaliphatic polyols such as ethylene glycol, diethylene glycol, 1,2-propylene glycol, 1,4-butylene glycol, glycerol, bis-(4-hydroxy-cyclohexyl)-2,2-propane, and the like.

There can also be employed polyglycidyl esters of polycarboxylic acids which are produced by the reaction of epichlorohydrin or a similar epoxy compound with an aliphatic or aromatic polycarboxylic acid such as oxalic acid, succinic acid, glutaric acid, terephthalic acid, dimerized linoleic acid, and the like.

Other epoxides which may be employed are acrylic polymers containing epoxy groups. Preferably, these acrylic polymers are polymers produced by copolymerizing a polymerizable ethylenically unsaturated epoxy group-containing monomer with at least one other ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate and 2-ethylhexyl acrylate. Also, hydroxyalkyl esters of acrylic acid and methacrylic acid containing from 2 to 4 atoms in the hydroxyalkyl group can be used. Examples include hydroxyethyl methacrylate and hydroxypropyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers are the alkyl esters of acrylic and methacrylic acid.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in which the monomers are soluble. Suitable solvents are aromatic solvents such as xylene and toluene and ketones such as methyl amyl ketone. Alternately, the acrylic polymer may be prepared by aqueous emulsion or dispersion polymerization techniques.

The average molecular weight of the polyepoxide can vary from about at least 200 to about 50,000. The polyglycidyl ethers and esters have relatively low molecular weights, that is, from about 200 to 3000, whereas the epoxy-containing acrylic polymers have relatively high molecular weights, that is, from about 2000 to 50,000.

To incorporate the sulfonium groups into the cationic resin, the epoxy resin is typically reacted with a sulfide acid mixture. The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include diethyl sulfide, dipropyl sulfide, dibutyl sulfide, diphenyl sulfide, dihexyl sulfide, ethylphenyl sulfide, tetramethylene sulfide, pentamethylene sulfide, thiodiethanol, thiodipropanol, thiodibutanol and the like. Preferably, the sulfide is of the structure R—S—R with R being alkyl or hydroxyalkyl containing from 2 to 12 carbon atoms. Most preferred is thiodiethanol, i.e., R containing 2 carbon atoms.

The acid employed may be virtually any acid which forms a ternary sulfonium salt. Preferably, the acid is an organic carboxylic acid. Examples of acids which may be employed are boric acid, formic acid, lactic acid, acetic acid, propionic acid, butyric acid, dimethylolpropionic acid, hydrochloric acid, phosphoric acid and sulfuric acid, with the acid dimethylolpropionic being preferred.

The ratio of sulfide to acid is not unduly critical. Since one mole of acid is utilized to form one mole of sulfonium group, it is preferred that at least one mole of acid be present for each mole of desired sulfide.

The sulfide-acid mixture and the epoxy resin are reacted by mixing the components usually at moderately elevated temperatures such as 60° to 95° C., preferably 70° to 85° C. Solvent is not necessary although one is often used in order to afford better control of the reaction. Aromatic hydrocarbons, monoalkyl ethers of ethylene glycol and of propylene glycol and aliphatic alcohols are suitable solvents. Examples include toluene, 2-butoxyethanol, monobutyl ether of propylene glycol and butanol. The proportions of the sulfide and the epoxy compound can be varied and the optimum proportions depend upon the particular reactants.

The alkyl phenoxide groups which are present in a cationic resin are typically those of the structure:

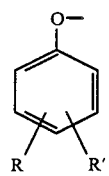

where R is an alkyl radical including branched and linear alkyl groups containing at least 4 and preferably from about 8 to 12 carbon atoms. Examples of alkyl groups include tertiary butyl, allyl, octyl, nonyl and dodecyl. R' can be hydrogen or an alkyl group of the type described for R. Examples of suitable alkyl phenoxide groups are those derived from alkyl phenols such as tertiary butyl phenol, allyl phenol, octyl phenol, nonyl phenol, dinonyl phenol and dodecyl phenol, with nonyl phenol being preferred.

The alkyl phenoxide groups are incorporated into the cationic resin typically by reacting the epoxy resin with the corresponding alkyl phenol. Reaction occurs readily, particularly in the presence of a catalyst such as ethyltriphenyl phosphonium iodide or benzyldimethylamine at a temperature of about 120° to 200° C., preferably 140° to 180° C. The epoxy resin and alkyl phenol can be reacted neat or preferably in the presence of a solvent such as xylene or methyl isobutyl ketone.

The order of reaction is not particularly critical although preferably the epoxy resin is reacted first with the alkyl phenol and then with the sulfide acid mixture. Since both the alkyl phenol and sulfide acid mixture react with the epoxide functionality, the amounts and equivalents of the reactants should be controlled so as to get the desired product.

For making pigment grinding vehicles suitable for use in electrodeposition, the cationic resin should contain from about 0.25 to 1.4 and preferably from 0.37 to 1 milliequivalents of ternary sulfonium per gram of resin. Lower milliequivalents of ternary sulfonium per gram of resin, i.e., lower than 0.25, are undesirable because the resin will have poor pigment wetting properties, whereas higher milliequivalents of ternary sulfonium per gram of resin, that is, higher than 1.4, are undesirable because the resin may be too water-soluble.

The amount of alkyl phenoxide groups in the cationic resin is preferably from 1.9 to 25, more preferably from 5 to 20 percent by weight based on total weight of cationic resin solids, that is, the weight of alkyl phenol divided by the total weight of reactants on a solid basis used in making the cationic resin. Amounts less than 1.9 percent by weight are undesirable because of thin film builds, whereas amounts greater than 25 percent by weight are undesirable because of free alkyl phenol and the resin may be too hydrophobic.

The pigment pastes of the present invention are prepared by grinding or dispersing a pigment into the cationic resin described above in a manner well known in the art. The pigment paste comprises as essential ingredients the sulfonium salt group-containing resins of the invention and at least one pigment. However, the paste in addition may contain optional ingredients such as plasticizers, wetting agents, surfactants or defoamers.

Grinding is usually accomplished by the use of ball mills, sand mills, Cowles dissolvers, continuous attritors and the like until the pigment has been reduced to a desired size and preferably has been wetted by and dispersed by the grinding vehicle. After grinding, the particle size of the pigment should be in the range of 10 microns or less, preferably as small as practical. Generally, a Hegman grind gauge reading of about 6 to 8, preferably 7 to 8, is employed.

Usually, grinding is conducted in an aqueous dispersion of the vehicle. The amount of water present in the aqueous grind should be sufficient to produce a continuous aqueous phase. The aqueous grind usually contains from about 30 to 70 percent solids. The use of more water merely reduces the effective capacity of the mill and while less water can be employed, higher resultant viscosity may create problems in certain instances. Although the pigment paste is usually prepared in the presence of water, water is not absolutely necessary and, in fact, the pigment dispersants of the present invention can be used to prepare nonaqueous pigment pastes which are subsequently dispersible in water-based compositions. The pigment-binder ratio in the grinding step is usually maintained within the range of about 1 to 10:1, preferably about 4 to 6:1.

Pigments which may be employed in the practice of the invention are pigments well known in the art. Generally, titanium dioxide is used along with other pigments such as antimony oxide, zinc oxide, basic lead carbonate, basic lead silicate, barium carbonate, calcium carbonate, aluminum silicate, silica, magnesium carbonate and magnesium silicate. Color pigments may also be employed, for example, cadmium yellow, cadmium red, carbon black, phthalocyanine blue, chrome yellow, toluidine red and hydrated iron oxide.

For a general review of pigment grinding in paint formulation, reference may be made to: D. H. Parker, *Principles of Surface Coating Technology*, Interscience Publishers, New York (1965); R. L. Yeates, *Electropainting*, Robert Draper Ltd., Teddington, England (1966); H. F. Payne, *Organic Coating Technology*, Vol. 2, Wiley and Sons, New York (1961).

The pigment paste of the present invention is usually combined with a cationic resinous vehicle known in the art for cationic electrodeposition. The cationic resin can be a ternary sulfonium salt group-containing resin such as the type described in U.S. Pat. No. 4,038,232. Alternately, the cationic resinous vehicle can be an amine group-containing cationic electrodepositable resin. Examples of such resins are those described in U.S. Pat. Nos. 3,947,339; 4,419,467, 4,423,166 and 4,468,307.

Enough of the pigment paste is used so that the final electrodepositable composition (electrodepositable resin plus pigment paste) has the proper color, opacity, application and film properties required for electrodeposition. In most instances, the final electrodepositable composition has a pigment-to-binder (electrodepositable resin plus pigment dispersing vehicle) ratio of between about 0.05 to about 0.5.

For electrodeposition a bath containing about 1 to 50, usually from 5 to 30 percent by weight solids, that is, pigment plus resinous vehicle, is usually employed. The final electrodepositable composition may contain in addition to the pigment dispersion and electrodeposition resin, adjuvant resins, solvents, anti-oxidants, surfactants and other adjuvants typically employed in an electrodeposition process.

The aqueous composition is then placed in contact with an electrically conductive anode and an electrically conductive cathode in an electric circuit. While in contact with the bath containing the coating composition, an adherent film of the coating composition is deposited on the cathode. The conditions under which the electrodeposition is carried out are, in general, similar to those used in the electrodeposition of other types of coatings. The applied voltage may be varied greatly and can be, for example, as low as one volt or as high as several thousand volts, although typically between 50 volts and 500 volts are usually employed. The current density is usually between about 0.25 ampere and 15 amperes per square foot and tends to decrease during electrodeposition. The method of the invention is applicable to the coating of any conductive substrate and especially metal such as steel, aluminum, copper and the like. After deposition, the coating is cured at elevated temperatures by any convenient method such as in baking ovens or with banks of infra-red heat lamps. Curing temperatures of 300°–400° F. (149°–204° C.) and curing times of 15 to 60 minutes are typical.

Illustrating the invention are the following examples which are not to be construed as limiting the invention to their details. All parts and percentages in the examples as well as throughout the specification are by weight unless otherwise specified.

EXAMPLES

The following examples show the preparation of various sulfonium salt group-containing resins, a pigment paste derived therefrom and the use of the pigment paste in cationic electrodeposition.

Examples 1–4 show the preparation of various sulfonium salt group-containing pigment grinding vehicles modified with various amounts of nonyl phenol and dodecyl phenol.

EXAMPLE 1

In this example, polyglycidyl ether of bisphenol A was reacted with nonyl phenol (13.8 percent by weight) and thiodiethanol and dimethylolpropionic acid (0.76 milliequivalents of sulfonium per gram of resin) as follows:

| Ingredients | Parts by Weight (in grams) | Solids (in grams) | Equivalents |
| --- | --- | --- | --- |
| EPON 828[1] | 694.9 | 694.9 | 3.696 |
| Bisphenol A | 214.2 | 214.2 | 1.878 |
| Nonyl phenol | 183.2 | 183.2 | 0.818 |
| Ethyltriphenyl phosphonium iodide | 1.1 | — | — |
| 2-Butoxyethanol | 555.0 | — | — |
| Thiodiethanol (50% active) | 244.2 | 122.1 | 1.0 |
| Lactic acid | 102.0 | 102.0 | 1.0 |
| Deionized water | 30.6 | — | — |

[1]Polyglycidyl ether of bisphenol A, available from Shell Chemical Company.

The EPON 828, bisphenol A and nonyl phenol were charged to a reaction vessel and heated to 107° C. and held at this temperature until the bisphenol A dissolves. The ethyltriphenyl phosphonium iodide was then added and the reaction mixture heated to 125° C. to initiate an exotherm. The reaction mixture was maintained at exotherm for about one hour until a viscosity of H-I (measured as a 50 percent resin solids solution in 2-methoxypropanol, DOWANOL PM) was obtained (epoxy equivalent weight of about 1099). The reaction mixture was cooled to 75° C. followed by the addition of the thiodiethanol, lactic acid and water. The reaction mixture was heated to 70°–75° C. and held at this temperature until an acid value of 0.561 was obtained. The reaction mixture was then cooled and found to have a solids content of 61.7 percent.

EXAMPLE 2

A cationic resin similar to that of Example 1 was prepared with the exception that 7.7 percent nonyl phenol was used and dimethylolpropionic acid was used in place of lactic acid. The resin was prepared from the following mixture of ingredients:

| Ingredients | Parts by Weight (in grams) | Solids (in grams) | Equivalents |
| --- | --- | --- | --- |
| EPON 828 | 515.1 | 515.1 | 2.740 |
| Bisphenol A | 158.8 | 158.8 | 1.393 |
| Nonyl phenol | 77.9 | 77.9 | 0.348 |
| Ethyltriphenyl | 0.75 | — | — |

| Ingredients | Parts by Weight (in grams) | Solids (in grams) | Equivalents |
|---|---|---|---|
| phosphonium iodide | | | |
| Monobutyl ether of propylene glycol | 201.6 | — | — |
| Thiodiethanol | 122.1 | 122.1 | 1.0 |
| Dimethylolpropionic acid | 134.0 | 134.0 | 1.0 |
| Deionized water | 30.6 | — | — |

The resin was prepared as generally described above in Example 1. The EPON 828, bisphenol A, nonyl phenol and ethyltriphenyl phosphonium iodide were heated as described in Example 1 until they achieved a viscosity of H (50 percent in DOWANOL PM, epoxy equivalent weight of 757). After the addition of the monobutyl ether of propylene glycol, thiodiethanol, dimethylolpropionic acid and water, the ingredients were heated to 70°–75° C. until an acid value of about 3 was obtained. The reaction mixture was cooled and diluted with water to a solids content of 36.1 percent.

EXAMPLE 3

The following example shows the preparation of a cationic resin similar to Example 1 with the exception that dodecyl phenol (5 percent by weight) was used in place of the nonyl phenol. The cationic resin was prepared from the following mixture of ingredients:

| Ingredients | Parts by Weight (in grams) | Solids (in grams) | Equivalents |
|---|---|---|---|
| EPON 828 | 660.8 | 660.8 | 3.515 |
| Bisphenol A | 260.6 | 260.6 | 2.286 |
| Dodecyl phenol | 61.5 | 61.5 | 0.229 |
| Ethyltriphenyl phosphonium iodide | 0.98 | — | — |
| 2-Butoxyethanol | 513.5 | — | — |
| Thiodiethanol (50% active) | 244.2 | 122.1 | 1.0 |
| Dimethylolpropionic acid | 134.1 | 134.1 | 1.0 |
| Deionized water | 30.6 | — | — |

The resin was prepared as generally described in Example 1. The EPON 828, bisphenol A, dodecyl phenol and ethyltriphenyl phosphonium iodide were heated to a viscosity of T (50 percent in DOWANOL PM, epoxy equivalent weight of 1020). After the addition of the 2-butoxyethanol, thiodiethanol, dimethylolpropionic acid and deionized water, the ingredients were heated to 70°–75° C. until an acid value of 2.24 was obtained. The reaction mixture was cooled and found to have a solids content of 66.3 percent.

EXAMPLE 4

The following example is similar to that of Example 1 with the exception that the resin contains about 1.9 percent by weight nonyl phenol. The resin was prepared from the following mixture of ingredients:

| Ingredients | Parts by Weight (in grams) | Solids (in grams) | Equivalents |
|---|---|---|---|
| EPON 828 | 533.2 | 533.2 | 2.836 |
| Bisphenol A | 199.6 | 199.6 | 1.751 |
| Nonyl phenol | 19.2 | 19.2 | 0.086 |
| Ethyltriphenyl phosphonium iodide | 0.75 | — | — |
| Monobutyl ether of propylene glycol | 201.6 | — | — |
| Thiodiethanol | 122.1 | 122.1 | 1.0 |
| Dimethylolpropionic acid | 134.1 | 134.1 | 1.0 |
| Deionized water | 30.6 | — | — |

The resin was prepared as generally described in Example 1. The EPON 828, bisphenol A, nonyl phenol and ethyltriphenyl phosphonium iodide were heated together until they achieved a viscosity of P (50 percent in DOWANOL PM, epoxy equivalent weight of 763). After the addition of the monobutyl ether of propylene glycol, thiodiethanol, dimethylolpropionic acid and water, the reactants were heated to 70°–75° C. until an acid value of 3.36 was obtained. The reaction mixture was cooled and thinned with additional water to a solids content of 36.2 percent.

EXAMPLES 5–8

The following examples show the preparation of various pigment pastes using the pigment grinding vehicles of Exaxples 1-4.

EXAMPLE 5

A pigment paste ground in a sand mill to a Hegman No. 7 grind was prepared from the following mixture of ingredients:

| Ingredients | Parts by Weight (in grams) | |
|---|---|---|
| Pigment grinding vehicle of Example 1 | 324.1 | (200 grams solids) |
| SURFYNOL 104E[1] | 4.5 | |
| Monobutyl ether of propylene glycol | 60.0 | |
| Deionized water | 792.9 | |
| Carbon black | 22.7 | |
| Lead silicate | 60.0 | |
| Clay | 100 | |
| Titanium dioxide | 817.3 | |

[1]Acetylenic alcohol from Air Products and Chemicals.

The pigment paste had a weight ratio of pigment to pigment grinding vehicle of 5.

EXAMPLE 6

A pigment paste similar to that of Example 5 was prepared with the exception that 625 grams (200 grams solids) of the pigment grinding vehicle of Example 2 was used in place of the pigment grinding vehicle of Example 1 and 492 grams of deionized water was used.

EXAMPLE 7

A pigment paste similar to that of Example 5 was prepared with the exception that 301.7 grams (200 grams solids) of the pigment grinding vehicle of Example 3 was used in place of the pigment grinding vehicle of Example 1 and 815 grams of deionized water was used.

EXAMPLE 8

A pigment paste similar to that of Example 5 was prepared with the exception that 689.7 grams (200 grams solids) of the pigment grinding vehicle of Example 4 was used in place of the pigment grinding vehicle of Example 1 and 427 grams of deionized water was used.

EXAMPLE 9

A catalyst paste was prepared by grinding dibutyltin oxide in the pigment grinding vehicle of Example 4 in a sand mill to a Hegman No. 7 grind. The paste contained the following ingredients:

| Ingredients | Parts by Weight (in grams) |
|---|---|
| Pigment grinding vehicle of Example 4 | 517.2 (150 grams solids) |
| SURFYNOL 104E | 1.5 |
| Deionized water | 200.0 |
| Dibutyltin oxide | 375.0 |

The paste had a pigment (dibutyltin oxide) to pigment grinding vehicle weight ratio of 2.5.

EXAMPLES 10–13

Cationic paints were prepared by blending 1518.2 grams of a cationic electrodeposition resin as described in Example B of U.S. Pat. No. 4,468,307; 232.0 grams of the additive of Example H of U.S. Pat. No. 4,468,307; 43.8 grams of the plasticizer PARAPLEX WP I available from Rohm and Haas; 478.3 grams of the pigment pastes of Examples 5–8; 32.1 grams of the pigment paste of Example 9 and sufficient water to make 3800 grams of paint.

The paints in the form of electrodeposition baths had solids contents of 25 percent and pigment to binder ratios of 0.3:1.0.

Untreated, rough steel panels (surface roughness 40 microinches, surface profile (deviation from mean surface) measured with a profilometer using a moving stylus method) were cathodically electrodeposited in the bath at 275 volts for 2 minutes at a bath temperature of 85° F. (29° C.). The coated panels were cured by heating at 340° F. (171° C.) for 30 minutes. Film thickness and smoothness of the coated panels were measured and are reported in the table below.

The smoothness of the cured electrodeposited film is determined indirectly by topcoating it with a glossy automotive quality top coat, i.e., 20° gloss of at least 80, and measuring the distinctness of image (DOI) of the cured top coat. The distinctness of image is the sharpness with which the cured top coat reflects images. Top coats which reflect images in a blurry fashion have a low DOI, whereas coatings which are more mirror-like in appearance have high DOI. It has been found that the DOI is directly related to the smoothness of the electrodeposition coating. The smoother the coating, the higher the DOI.

For determining DOI's, the cured electrodeposited coatings over the rough steel substrates were topcoated with an automotive quality top coat composition which is based on a non-aqueous dispersion acrylic enamel available from PPG Industries, Inc. as DXF 9385 Black. The composition is reduced with an organic solvent mixture comprising 20.8 percent n-heptane, 24.2 percent acetone, 12.6 percent toluene, 13.2 percent of Dibasic ester from E. I. Du Pont de Nemours, 11.3 percent 2-ethoxyethanol, 8.7 percent of an aromatic naphtha available from Exxon Oil Company as Aromatic 150 and 9.2 percent of naphtha available from Ashland Chemical Company as Hi-Initial VM&P Naphtha so as to obtain a 17-second viscosity measured with a No. 4 Ford cup. The top coat is applied by spraying and is cured by flashing at ambient conditions for 15 minutes followed by heating for 30 minutes at 250° F. (127° C.) to produce a coating having a dry film thickness of about 37.5 microns. The DOI of the top coat is measured with a Dori-Gen Meter D47-6 manufactured by Hunter Laboratories.

TABLE
Film Thickness and Smoothness of Cationic Electrodeposition Primers of Examples 10–13

| Cationic Electrodeposition Primer of Example | Pigment Grinding Vehicle of Example | Film Thickness[1] (in mils) | DOI |
|---|---|---|---|
| 10 | 1 | 1.15–1.3 | 93 |
| 11 | 2 | 1.17–1.12 | 92.1 |
| 12 | 3 | 1.1–1.3 | 92.2 |
| 13 | 4 | 1.1–1.13 | 91.6 |

[1]Film thickness given as a range over length of panel.

DOI's over 90 at 30 microns or greater top coat thickness on 40 microinch steel are considered excellent.

Galvanized steel panels were also electrodeposited in baths at 275 volts at a bath temperature of 90° F. (32° C.). The coated panels were cured by heating at 340° F. (171° C.) for 30 minutes. The cured coatings has excellent appearance being smooth and free of pinholes.

I claim:

1. A cationic resin suitable for use as a pigment grinding vehicle capable of producing smooth films while maintaining high rupture voltages which is derived from an epoxy resin and which contains ternary sulfonium groups and alkyl phenoxide groups in which the alkyl group contains at least 4 carbon atoms; said cationic resin containing from 0.25 to 1.4 milliequivalents of ternary sulfonium group per gram of resin and containing from 1.9 to 25 percent by weight of alkyl phenoxide groups based on weight of cationic resin; said alkyl phenoxide groups being present in the cationic resin by reaction of the corresponding alkyl phenol with epoxide functionality of the epoxy resin.

2. The cationic resin of claim 1 in which the epoxy resin is a polyglycidyl ether of a polyphenol.

3. The cationic resin of claim 2 in which the polyglycidyl ether of a polyphenol has an average molecular weight of 200 to 3000.

4. The cationic resin of claim 1 in which the ternary sulfonium groups are of the structure

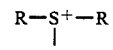

wherein R is alkyl or hydroxyalkyl containing from 2 to 12 carbon atoms.

5. The cationic resin of claim 1 in which the alkyl phenoxide group contains from 8 to 12 carbon atoms in the alkyl group.

6. A pigment grinding vehicle capable of producing smooth films while maintaining high rupture voltages which is derived from an epoxy resin and which contains ternary sulfonium groups and alkyl phenoxide groups in which the alkyl group contains at least 4 carbon atoms; said pigment grinding vehicle containing from 0.25 to 1.4 milliequivalents of ternary sulfonium group per gram of resin and containing from 1.9 to 25 percent by weight alkyl phenoxide groups based on weight of cationic resin; said alkyl phenoxide groups being present in the cationic resin by reaction of the corresponding alkyl phenol with epoxide functionality of the epoxy resin.

7. The pigment grinding vehicle of claim 6 in which the epoxy resin is a polyglycidyl ether of a polyphenol.

8. The pigment grinding vehicle of claim 7 in which the polyglycidyl ether of the polyphenol has an average molecular weight of 200 to 3000.

9. The pigment grinding vehicle of claim 7 in which the ternary sulfonium groups are of the structure $$R-S^+-R$$
$$|$$

where R is alkyl or hydroxyalkyl containing from 2 to 12 carbon atoms.

10. The pigment grinding vehicle of claim 7 in which the alkyl phenoxide contains from 8 to 12 carbon atoms in the alkyl group.

11. A pigment paste comprising the pigment grinding vehicle of claim 6 and a pigment dispersed therein.

12. The pigment paste of claim 11 in which the ratio of pigment to pigment grinding vehicle is within the range of 1 to 10:1.

13. The pigment paste of claim 11 in which the epoxy resin is a polyglycidyl ether of a polyphenol.

14. The pigment paste of claim 12 in which the polyglycidyl ether of the polyphenol has an average molecular weight of 200 to 3000.

15. The pigment paste of claim 11 in which the ternary sulfonium groups are of the structure $$R-S^+-R$$
$$|$$

where R is alkyl or hydroxalkyl containing from 2 to 12 carbon atoms.

16. The pigment paste of claim 11 in which the alkyl phenoxide contains from 8 to 12 carbon atoms in the alkyl group.

* * * * *